United States Patent [19]

Heinrich et al.

[11] Patent Number: 5,188,463
[45] Date of Patent: Feb. 23, 1993

[54] BEARING FOR THE SHAFT OF A CANNED MOTOR PUMP

[75] Inventors: Hansjörg Heinrich, Leinburg; Peter Rupprecht, Bayreuth, both of Fed. Rep. of Germany

[73] Assignee: KSB Aktiengesellschaft, Frankenthal/Pfalz, Fed. Rep. of Germany

[21] Appl. No.: 671,780

[22] Filed: Apr. 15, 1991

[51] Int. Cl.⁵ .............................................. F16C 23/02
[52] U.S. Cl. .................................... 384/441; 384/271
[58] Field of Search ............... 384/271, 272, 441, 247, 384/438, 428

[56] References Cited

U.S. PATENT DOCUMENTS

| | | | |
|---|---|---|---|
| 3,009,747 | 11/1961 | Pitzer | 384/272 |
| 3,121,596 | 2/1964 | Price | 384/272 |
| 3,124,998 | 3/1964 | Raehrs | 384/272 |
| 4,634,299 | 1/1987 | Svensson | 384/271 |

FOREIGN PATENT DOCUMENTS

| | | |
|---|---|---|
| 0201030 | 1/1981 | |
| 943868 | 6/1956 | Fed. Rep. of Germany . |
| 1528718 | 6/1969 | Fed. Rep. of Germany . |
| 3622269 | 1/1988 | Fed. Rep. of Germany . |

*Primary Examiner*—Lenard A. Footland
*Attorney, Agent, or Firm*—Peter K. Kontler

[57] ABSTRACT

A canned motor pump has a housing and a shaft which is mounted for rotation internally of the housing and extends between the pump and the motor. The end of the shaft remote from the pump is received by a plain bearing bushing. The bushing is press-fitted into a sleeve having a threaded section which serves to releasably connect the sleeve to the housing. The sleeve has another section which is adjacent to the threaded section and is provided with a conical surface. The conical surface cooperates with a complementary surface on the housing to center the sleeve.

5 Claims, 1 Drawing Sheet

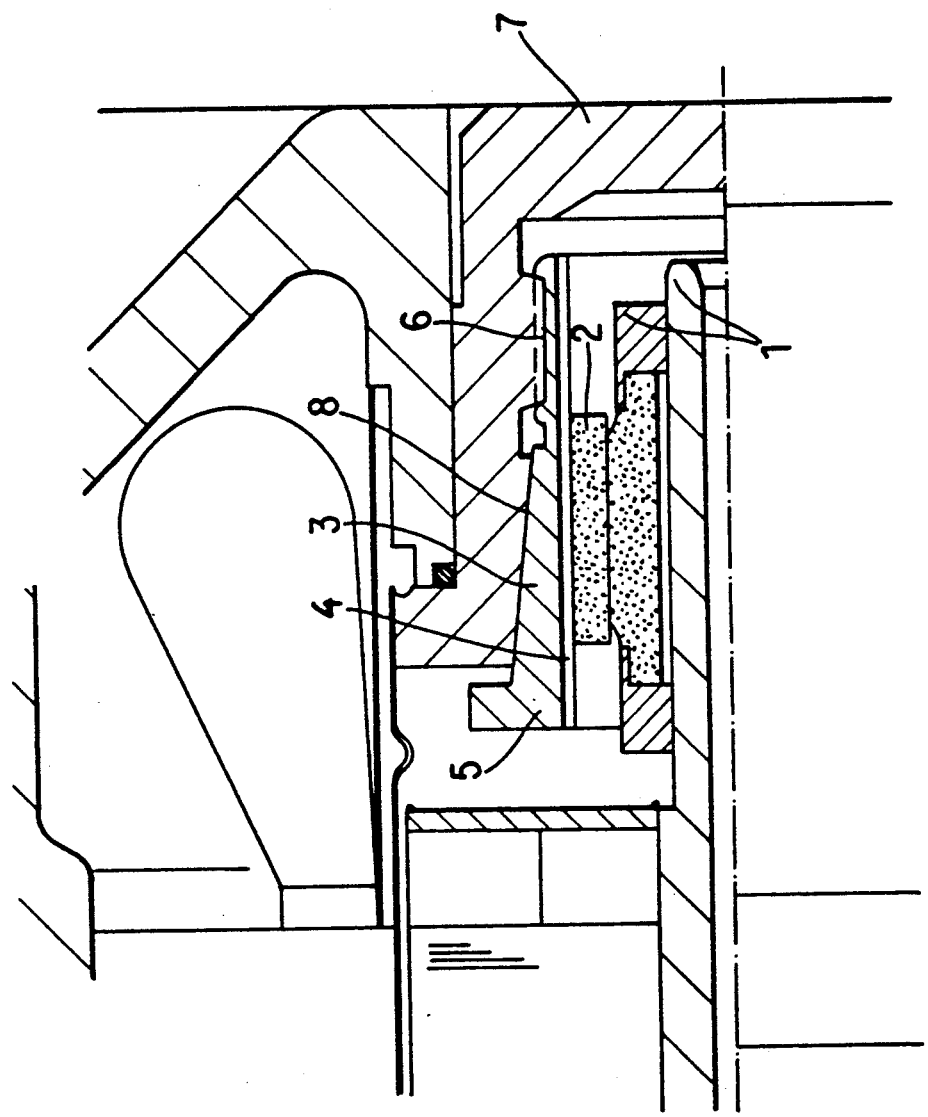

BEARING FOR THE SHAFT OF A CANNED MOTOR PUMP

The invention relates to a bearing for that end of the shaft of a canned motor pump remote from the pump, the bearing having a plain bearing bushing which surrounds the end of the shaft. Fixing and, even more so, interchange of the bearing bushings are associated with problems relating to the housing design and life of such aggregates. Until now, two alternative bearing layouts, both of which have drawbacks, were available to the artisan.

If the first alternative, pressing in of the bearing bushings, were selected, the housing design for the canned motor had to permit opening of the housing wall and removal of the housing part which carries the bearing bushing. Such a design, which requires additional sealing and centering surfaces, is necessarily expensive and complicated.

A less complicated and cheaper solution is to clamp the bearing bushing in a recess of the housing. This makes it possible to construct the side of the motor housing remote from the pump with a closed wall. Nevertheless, there is a significant drawback here also: the selected fixing mode, clamping, does not yield the required precision in alignment of the front and rear plain bearings. This can lead to problems during mounting of the canned pump, to disturbances in operation and to premature wear.

It is an object of the invention to provide a bearing of the type indicated at the outset which allows the plain bearing bushing on the side of the canned motor remote from the pump to be exchanged from the side near the pump and assures that accurate alignment with the plain bearing bushing on the side near the pump is maintained.

According to the invention, the stated object is achieved by a tapered sleeve which carries the plain bearing bushing and is releasably connected with the housing of the canned motor pump by a thread as well as a cone adjacent to the thread and serving to center the tapered sleeve.

The tapered sleeve formed with thread and centering cone establishes the position of the tapered sleeve carried thereby with reproducible accuracy. Following removal of the rotor shaft, replacement of the bearing bushing can thus be readily accomplished by a simple screwing procedure, e.g., using a socket wrench.

In an advantageous embodiment of the invention, a plurality of axially extending grooves are provided in the region of that surface of the tapered sleeve which surrounds the plain bearing bushing. The grooves form channels for the cooling stream directed to the canned motor via the bearing and reduce resistance to flow.

The invention is described in greater detail with reference to an exemplary embodiment. The drawing illustrates a segment of the motor of a canned motor pump in the region of the end of the shaft remote from the pump.

The end 1 of the shaft is surrounded by a plain bearing bushing 2 which is pressed into a tapered sleeve 3. A plurality of grooves 4 distributed over the periphery are arranged in the inner wall of the tapered sleeve 3.

The tapered sleeve 3, which has an hexagonal head 5, is provided with a thread 6 for establishing a releasable connection with the housing 7 of the canned motor. Between the hexagonal head 5 and the thread 6 is a cone 8 which cooperates with a similarly formed complementary surface of the housing 7 to center the plain bearing bushing 2.

We claim:

1. Bearing for the shaft of a canned motor pump, comprising a first annular member for receiving a portion of the shaft; and a second annular member which surrounds and carries said first annular member, said second annular member having means for releasably connecting said second annular member with the housing of the motor pump and centering said second annular member, and said connecting and centering means including a thread on a first section of said second annular member, and a conical surface on a second suction of said second annular member.

2. The bearing of claim 1, wherein said second annular member has an internal surface adjacent to said first annular member and said internal surface is provided with at least one groove.

3. The bearing of claim 2, wherein said groove extends in axial direction of said second annular member.

4. The bearing of claim 1, wherein said first annular member comprises a plain bearing bushing.

5. The bearing of claim 1, wherein said conical surface is adjacent to said thread.

* * * * *

UNITED STATES PATENT AND TRADEMARK OFFICE
CERTIFICATE OF CORRECTION

PATENT NO. : 5,188,463
DATED : February 23, 1993
INVENTOR(S) : Hänsjorg HEINRICH et al It is certified that error appears in the above-indentified patent and that said Letters Patent is hereby corrected as shown below:

On the title page:

Item [30] Foreign Application Priority Data: was omitted and should read as follows:

--Oct. 13, 1988 [DE] Fed. Rep. of Germany..........P3834862--.

Item [22] Filed: April 15, 1991: should be deleted, and the following information should be inserted:

--[22] PCT Filed: Oct. 10, 1989

[86] PCT No.: PCT/EP89/01193
§ 371 Date: Apr. 15, 1991
§ 102(e) Date: Apr. 15. 1991--.

Signed and Sealed this

Fifth Day of April, 1994

Attest:

BRUCE LEHMAN

*Attesting Officer*     *Commissioner of Patents and Trademarks*